March 5, 1968  M. LEIBOW  3,371,417

EDGE BEVELING TOOL

Filed Oct. 31, 1966

INVENTOR
Martin Leibow

BY
ATTORNEY

United States Patent Office 3,371,417
Patented Mar. 5, 1968

3,371,417
EDGE BEVELING TOOL
Martin Leibow, 7007 Mason Dells,
Dallas, Tex. 75230
Filed Oct. 31, 1966, Ser. No. 590,926
9 Claims. (Cl. 30—293)

This invention relates to a tool for cutting a bevel in an edge of a part, and more particularly to a manually operated self-contained assembly for providing an edge beveling operation.

Decorative laminates, usually composed of a hard thermosetting plastic material, are widely used for covering tables, kitchen counters and the like. Usually, a sheet of the laminate is bonded to the top of the surface to be finished and a strip of the material is bonded along the front edge of the surface. The joint between the strip and sheet is thus exposed and this edge must be finished in some way which is durable and pleasing to the eye without undue expense or time consuming effort. A preferred manner of finishing this edge is by beveling, that is, by removing a portion of the material at an angle in an even strip along the corner where the two laminate parts abut one another. Tools which have been used for this purpose have been awkward to operate and generally produce uneven, non-reproducible results.

It is a principal object of this invention to provide a tool which may be easily operated manually to bevel the edge of a workpiece of the type such as a wooden part or the like having a decorative plastic laminate bonded thereto. Another object is to provide a manually operated edge beveling tool which has an adjustable blade firmly anchored to produce a clean, even cut but yet readily positioned for varying angles and depths of bevel. An additional object is the provision of a tool having the features as just described wherein the blade may be removed for sharpening or the like and replaced without altering the angle and depth adjustments.

In accordance with this invention, an edge beveling tool is provided which includes a frame assembly having a pair of handles or the like for manual operation whereby the operator traverse the tool along the edge of the workpiece to be finished. Of course, a similar assembly could be used for mechanical operation, as by a motor driven arrangement, but will be discussed here in the context of a hand operated device. On one side of the frame assembly is provided a notch-like cutout, with appropriate bearing material being positioned on the facing planes of the notch to contact and bear against the surface of the workpiece without marring the finish of the decorative laminate. A cutting blade is positioned at the corner of this notch-like cutout to engage the edge to be beveled, and this blade is firmly supported by the frame but yet is adjustable with respect to the bearing planes or notch to provide varying angles and/or depths of cut. The blade is secured to or integral with an arm-like member which is positioned in the interior of the frame, with access to the interior being provided by a removable cover plate or the like which may advantageously form a part of the outer covering and handles for the tool. The arm-like member is pivotally mounted on a plate which in turn is adjustably secured to a fixed part of the frame with provision for movement in two directions in a plane generally parallel to that of the blade or perpendicular to the line of the bevel. Positioning of the arm member with respect to the plate permits adjustment of the blade angle, while positioning of the plate with respect to the frame permits variation of the depth of cut as well as the blade angle since these factors will be interrelated. A set screw or the like affixed to the plate and bearing upon the arm member firmly supports the blade from the back so that the blade is not held merely by the pivotal mounting arrangement, and also provides a reference so that the arm and blade may be removed and reinserted at the same angle and position without readjustment.

The novel features believed characteristic of this invention are set forth in the appended claims. The invention itself, however, as well as further objects and advantages thereof, will best be understood by reference to the following detailed description of a particular embodiment, read in conjunction with the accompanied drawings, wherein:

Figure 1:
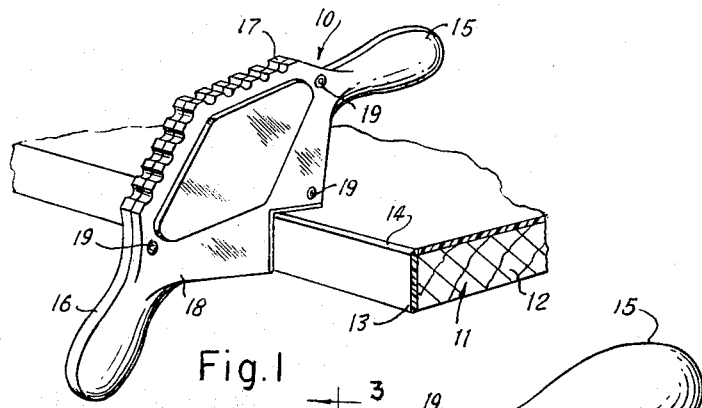
FIGURE 1 is a pictorial view of the edge beveling tool of this invention shown in an operative position engaging a workpiece.

Referring now to FIGURE 1, an edge beveling tool 10 in accordance with this invention is illustrated in an operative position engaging the corner of a workpiece 11 which typically may take the form of a wooden core or backing piece 12 having a plastic laminate 13 on two faces thereof. This laminate 13 ordinarily would be composed of a thermosetting plastic which is widely used as a decorative, waterproof, and wear resistant covering for tables, kitchen cabinets, and the like. The plastic laminate 13 is secured to the wood part 12 by an adhesive. The two pieces of plastic laminate 13 abut one another at right angles, and it is the purpose of the cutting device of this invention to provide a bevel 14 at the corner or edge where these pieces engage one another.

The edge beveling tool 10 is comprised of a two piece casing which provides a pair of handles 15 and 16 by which the operator manually grasps the tool and forces it along the edge of the workpiece 11 to produce the bevel 14. The tool 10 is constructed generally of two parts 17 and 18 which may be fabricated by forging or casing of aluminum or other suitable material. These two parts are held together with three bolts 19 which pass through holes in the part 18 and engage threaded holes 20 in the part 17, as seen in FIGURE 2.

A cutter blade 21 is adjustably mounted within the interior of the tool and it exposed in a manner such as to engage the workpiece at the corner or apex of a notch-like cutout defining a pair of bearing surfaces 22 and 23 on the lower side of the tool 10. A cutaway portion 24 is provided to expose the blade 21. The bearing surfaces 22 and 23 may be composed of a material such as nylon or Teflon, the latter being a trade name of polytetrafluoroethylene, or the like, to facilitate movement of the tool along the edge of the workpiece and to prevent marring of the decorative surface of the laminate 13.

Figure 3:
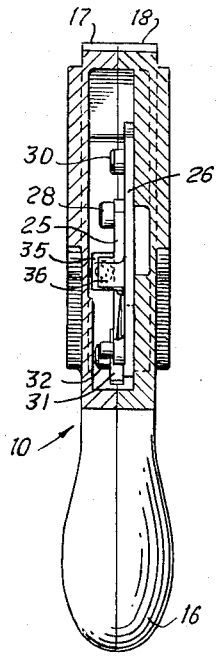
FIGURE 3 is an elevation view in section of the tool of FIGURE 2 taken along the line 3—3 in FIGURE 2.
Figure 2:
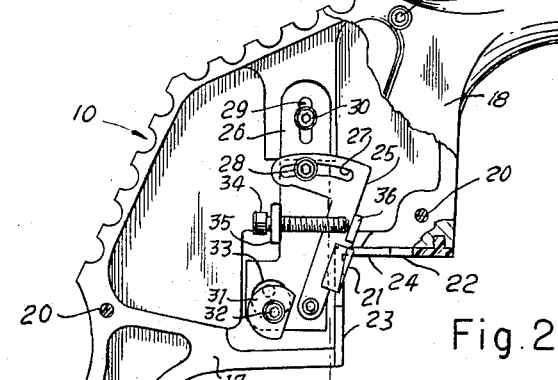
FIGURE 2 is an elevation view partly broken away and partly in section of the edge beveling tool of this invention, taken along the line 2—2 of FIGURE 5.
Figure 4:
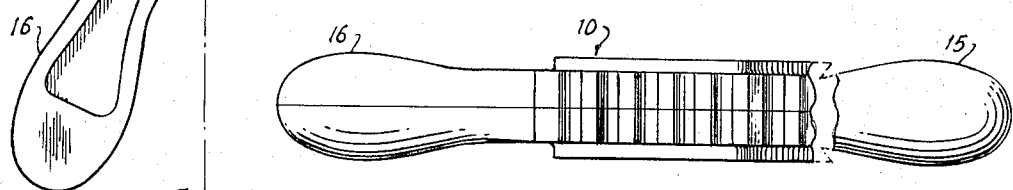
FIGURE 4 is a top view of the edge beveling tool of FIGURES 1–3, partially shortened.
Figure 5:
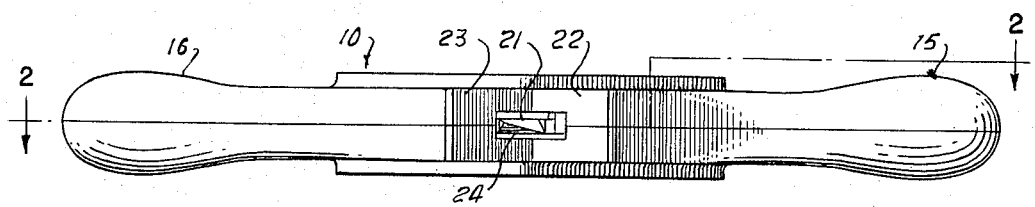
FIGURE 5 is a bottom view of the tool of FIGURES 1–4.

With reference to FIGURES 2 and 3, the blade 21 is mounted with provision for moving in a vertical direction, for varying the angle of the blade, for changing the part of the blade which actually engages the workpiece and performs the beveling operation, and for moving the blade in a horizontal direction from left to right as seen in FIGURE 2, all of these factors being interrelated but in general allowing for changing the angle and depth of the bevel. The blade 21 is firmly secured to an arm member 25 which is pivotally mounted at one end to a plate 26. The free end of the arm 25 includes a curved slot 27 through which a set screw 26 passes to engage a threaded hole in the plate 26. Vertical adjustment of the blade is provided by means of a vertical slot 29 in the plate 26, with a set screw 30 passing through this slot and engaging a threaded hole in the part 17. Horizontal or vertical adjustment of the plate 26, and thus the blade 21, is accommodated by the mounting means used for the lower end of this member, such mounting means including a washer 31 along with a set screw 32 which passes through the hole in the washer, through a large hole 33 in the plate 26, and engages one of two threaded holes in the part 17. This arrangement provides wide latitude of movement of the plate 26 and thus of the blade 21.

To assure that the blade 21 is firmly supported from the rear rather than merely held in position by the set screw 28 in the slot 27, a threaded bolt 34 is provided which engages a raised member 35, the latter being a part of plate 26, and bears upon a raised lip 36 on the arm 25. It will also be noted that the blade 21 may be readily removed for sharpening or replacement by merely removing the set screws in the arm 25, while the set screws in the plate 26 as well as the bolt 34 will remain fixed so that the arm 25 will be in the same position when replaced. Thus, readjustment of the blade position is not necessary and the same angle and depth of bevel will result.

In operation, access to the interior of the assembly for the purpose of adjusting the blade 21 is attained by removing the bolts 19 to separate the part 18 from the part 17. The proper angle for the cutter or blade 21 is achieved by backing off on the threaded bolt 34 if necessary to free the arm 25 for movement. The bolt 28 is loosened so that the arm 25 may be rotated about the lower pivoted point, which as well may comprise a set screw which would be loosened for this adjustment. The set screws 30 and 32 are likewise loosened and the member 26 adjusted in vertical and horizontal directions to provide the desired depth of cut and angle of cut. If a higher blade position is needed, as may be the case when one part of the blade is worn or dull, the set screw 32 may be threaded into the upper one of the two holes provided, rather than the lower one as illustrated in FIGURE 2, thus permitting the plate 26 to move up. When the appropriate blade angle and position has been achieved all of these set screws 28, 30 and 32 are tightened and the threaded bolt 34 is brought to engagement with the lip 36 to provide a firm backing for the blade.

With the blade 21 appropriately positioned, the two parts 17 and 18 of the assembly are secured together with the bolts 19 and the tool is now ready for operation in the manner discussed above with reference to FIGURE 1.

While the edge beveling tool of this invention has been described with reference to a particular embodiment, it is of course understood that this description is not to be construed in a limiting sense. Other embodiments of the invention, as well as modifications of the disclosed embodiment, will be apparent to persons skilled in the art upon reference to this specification. It is therefore contemplated that the appended claims will cover any such modifications or embodiments as fall within the true scope of this invention.

What is claimed is:

1. A tool comprising a frame having handle means for manual engagement, one side of said frame defining a notch with the faces of the notch providing bearing surfaces for engaging a workpiece, a cutting blade positioned adjacent the corner of said notch, an adjustable plate secured to said frame, an arm member pivotally mounted on said plate with said cutting blade being on one side of said arm member, and adjustable detent means fixed to said plate and bearing upon said arm member from a direction opposite said notch.

2. A tool according to claim 1 wherein said plate is secured to said frame by means of a pair of set screws which engage the frame and pass through apertures in said plate much larger than such set screws to permit adjustment of the plate relative to the frame.

3. A tool according to claim 2 wherein said arm member is secured to said plate by means of a pair of set screws one of which engages the plate and passes through the arm member in a manner such as to permit the arm member to pivot relative to the plate but not to permit lateral movement of the arm member relative to the plate, the other of said set screws engaging the plate and passing through a curved slot in said arm member.

4. A tool according to claim 3 wherein said detent means comprises a threaded bolt generally parallel to said plate passing through a threaded hole in a portion of said plate.

5. A tool according to claim 4 wherein said bearing surfaces of said notch include a smooth, somewhat resilient bearing material to avoid marring the finish of said workpiece.

6. A tool for beveling an edge of a workpiece comprising a frame having a pair of bearing faces supported thereby and positioned at an angle with respect to one another for engagement with the edge of such workpiece, a cutting blade positioned generally at the apex of such angle, the blade being supported by a pivoted part which is adjustably secured to a support member, the support member mounted on said frame with provision for movement of the support member with respect to the frame in two directions in a plane generally parallel to that of said blade, the blade thereby being adjustable in angle of cut and in depth of cut with respect to said bearing faces, and means for engaging said frame for providing movement of the entire assembly along the edge of said workpiece.

7. A tool according to claim 6 wherein movable detent means fixed to said support member bears upon said pivoted part on the side thereof which is opposite the said bearing faces to provide firm support for said blade during the beveling operation.

8. A tool according to claim 7 wherein said pivoted part is affixed to said support member by a pair of fastening means one of which permits only pivotal movement relative to the support member and the other permitting lateral movement.

9. A tool according to claim 8 wherein said support member is affixed to said frame by a pair of fastening means which firmly engage the frame and traverse enlarged apertures in said support member.

References Cited

UNITED STATES PATENTS

| | | | |
|---|---|---|---|
| 322,304 | 7/1885 | Mander | 145—6 X |
| 1,021,631 | 3/1912 | Savage | 145—6 |
| 1,589,156 | 6/1926 | Hartman | 30—312 X |
| 2,650,422 | 9/1953 | Soltow et al. | 30—320 X |

JAMES L. JONES, JR., *Primary Examiner.*